(12) United States Patent
Naoi et al.

(10) Patent No.: US 8,343,669 B2
(45) Date of Patent: *__Jan. 1, 2013__

(54) ELECTROCHEMICAL DEVICE

(75) Inventors: Katsuo Naoi, Tokyo (JP); Kenji Nishizawa, Tokyo (JP); Mitsuo Kougo, Tokyo (JP)

(73) Assignee: TDK Corporation, Tokyo (JP)

(*) Notice: Subject to any disclaimer, the term of this patent is extended or adjusted under 35 U.S.C. 154(b) by 583 days.

This patent is subject to a terminal disclaimer.

(21) Appl. No.: 12/407,294

(22) Filed: Mar. 19, 2009

(65) Prior Publication Data

US 2009/0246638 A1 Oct. 1, 2009

(30) Foreign Application Priority Data

Mar. 26, 2008 (JP) ................................ P2008-081294

(51) Int. Cl.
*H01M 4/00* (2006.01)
(52) U.S. Cl. ........................................ 429/246; 429/144
(58) Field of Classification Search .................. None
See application file for complete search history.

(56) References Cited

U.S. PATENT DOCUMENTS

2005/0219802 A1* 10/2005 Kobayashi et al. ........... 361/523

FOREIGN PATENT DOCUMENTS

| JP | A-11-312506 | 11/1999 |
| JP | A-2000-100399 | 4/2000 |
| JP | 2002270239 A * | 9/2002 |

* cited by examiner

*Primary Examiner* — Ula C Ruddock
*Assistant Examiner* — Daniel Gatewood
(74) *Attorney, Agent, or Firm* — Oliff & Berridge, PLC

(57) ABSTRACT

An electrochemical device comprises an electrode matrix including a multilayer structure composed of a positive electrode, a negative electrode, and a first separator, and first and second dummy electrodes electrically connected to the positive and negative electrodes, respectively. The first and second dummy electrodes have respective opposing parts opposing each other through a second separator at an outer peripheral part of the electrode matrix. One or each of the first and second dummy electrodes has a resistance control layer at least on a side where the opposing parts oppose each other. The resistance control layer has such a resistance value that an estimated internal short circuit current between the first and second dummy electrodes is equivalent to 0.09 C to 1.00 C. The first and second dummy electrodes are adapted to short-circuit each other at a lower temperature than the positive and negative electrodes do.

9 Claims, 6 Drawing Sheets

ELECTROCHEMICAL DEVICE

BACKGROUND OF THE INVENTION

1. Field of the Invention

The present invention relates to an electrochemical device.

2. Related Background Art

As portable electronic devices have been becoming widespread, there have been increasing demands for lightweight, small-size electrochemical devices which can continuously be driven for a long time, such as secondary batteries. While conventional secondary batteries used metal outer cans, it has become possible to reduce the battery weight by employing thin, lightweight films for outer bags, as typified by lithium polymer batteries, thereby increasing the degree of freedom in designing.

When some abnormalities happen in a battery using such a film as its outer bag, gases may be generated or, in the worst case, ignition may occur depending on kinds of electrolytes in use. While chargers are set such as to stop charging when reaching a predetermined time or voltage, electrochemical devices will be overcharged if the charging does not stop before exceeding their capacity by some reason. As the overcharged state further progresses, electrolytes may decompose, so as to yield gases, which may inflate outer bags and cause internal short circuits due to internal deformations, thereby exploding the bags or igniting the electrochemical devices.

It has also been known that secondary batteries using lithium ions are likely to cause thermal runaway when a certain temperature is exceeded. Thermal runaway generates gases and further heat, thereby exploding or igniting the batteries.

For evading such circumstances, mechanisms provided with safety valves so as to release gases when the internal pressure rises have been under study, for example, as described in Japanese Patent Application Laid-Open Nos. 2000-100399 and HEI 11-312506.

SUMMARY OF THE INVENTION

However, safety valves such as those mentioned above do not always act stably. Also, if outer packages are inflated by internal pressures so that pressures apply to electrode matrixes before the safety valves act, the electrode matrixes may deform, thereby generating internal short circuits, so that the inner heat may cause thermal runaway in positive electrodes, which may lead to explosion or ignition in the worst case.

In view of the problems of the prior art mentioned above, it is an object of the present invention to provide an electrochemical device which prevents it from exploding and igniting because of temperature rises within its outer package, thereby dramatically improving its safety.

For achieving the above-mentioned object, the present invention provides an electrochemical device comprising an electrode matrix including a multilayer structure laminating positive and negative electrodes with a first separator interposed therebetween, and first and second dummy electrodes respectively arranged on both end faces in the laminating direction of the electrode matrix; wherein one of the first and second dummy electrodes and the other are electrically connected to the positive and negative electrodes in the electrode matrix, respectively; wherein the first and second dummy electrodes have respective opposing parts opposing each other through a second separator at an outer peripheral part of the electrode matrix; wherein one or each of the first and second dummy electrodes has a resistance control layer at least on a side where the opposing parts oppose each other; wherein the resistance control layer has a resistance value as a total resistance value of the first and second dummy electrodes falling in such a range that an estimated internal short circuit current between the first and second dummy electrodes is equivalent to 0.09 C to 1.00 C; and wherein the first and second dummy electrodes opposing each other through the second separator are adapted to short-circuit each other at a lower temperature than the positive and negative electrodes opposing each other through the first separator in the electrode matrix do.

In the present invention, "estimated internal short circuit current" refers to a current which is tolerable in terms of safety when the first and second dummy electrodes in the present invention are short-circuited at an abnormally high temperature. In other words, it means a safe current range when an internal short circuit occurs between the first and second dummy electrodes. The value of the estimated internal short circuit current can be calculated by Ohm's law (V=IR) according to the capacity of the cell and the fully charged battery voltage. Supposing that the cell capacity and the fully charged battery voltage are 2 [Ah] and 4.2 [V], respectively, for example, the resistance value needed for making the estimated internal short circuit current equivalent to 1 C is 4.2 [V]/(2×1) [A]=2.1 [Ω]. The resistance value needed for making the estimated internal short circuit current equivalent to 0.1 C in the same cell is 4.2 [V]/(2×0.1) [A]=21 [Ω]. Here, "equivalent to 1 C" refers to a current corresponding to an amount charged/discharged for 1 hr with a current corresponding to the cell capacity.

As a result of diligent studies, the inventors have found that the safety of an electrochemical device can be secured by providing the first and second dummy electrodes and setting the total resistance value in the thickness direction of the first and second dummy electrodes to such a range that the estimated internal short circuit current is equivalent to 0.09 C to 1.00 C. That is, when placed in a dangerous temperature atmosphere by a temperature rise within the outer package, the electrochemical device in accordance with the present invention can generate moderate self-discharge, so as to shift active materials used in the electrochemical device to more thermostable regions, whereby the safety of the electrochemical device can be improved dramatically. Such effects are obtained because, before the positive and negative electrodes in the electrode matrix short-circuit each other, the first and second dummy electrodes come into electrical contact with each other through the resistance control layer, thereby causing a moderate internal short circuit. Here, the short circuit occurs when the second separator shrinks or melts, for example, so that the first and second dummy electrodes come into electrical contact with each other through the resistance control layer. The first and second dummy electrodes thus moderately short-circuit each other through the resistance control layer, thereby making it possible to safely lower the battery capacity, evade thermal runaway due to the Joule heat at the time of hard short-circuiting, and prevent the outer package from exploding and the electrochemical device from igniting, thereby dramatically improving the safety of the electrochemical device in abnormally high temperature atmospheres.

Preferably, in the electrochemical device of the present invention, each of the first and second dummy electrodes has the resistance control layer, while the total of the resistance value in the thickness direction of the resistance control layer in the first dummy electrode and the resistance value in the thickness direction of the resistance control layer in the second dummy electrode falls within the range mentioned above. It will also be preferred in the electrochemical device of the present invention if one of the first and second dummy electrodes has the resistance control layer, while the resistance value in the thickness direction of the resistance control layer falls within the above-mentioned range.

In other words, while any or each of the first and second dummy electrodes may be provided with the resistance control layer, its resistance value in the thickness direction is preferably adjusted so as to fall within the above-mentioned range between the first and second dummy electrodes. When a short circuit occurs between the first and second dummy electrodes, an extremely safe and moderate internal short circuit can be generated because the resistance control layer having the above-mentioned resistance value is interposed therebetween, whereby the safety of the electrochemical device in abnormally high temperature atmospheres can dramatically be improved.

Preferably, in the electrochemical device of the present invention, the resistance control layer is a layer containing carbon black, a binder, and a ceramic particle. This makes it easier to adjust the resistance value of the resistance control layer in the thickness direction, so that a thin resistance control layer having a favorable resistance value can be formed, whereby the safety of the electrochemical device in abnormally high temperature atmospheres can further be improved.

Preferably, the ratio of the content of the carbon black to that of the binder and ceramic particle in the resistance control layer is 1:99 to 10:90 in terms of mass ratio. When the contents of these components fall within the range mentioned above, a thin resistance control layer having a favorable resistance value can easily be formed, whereby the safety of the electrochemical device in abnormally high temperature atmospheres can further be improved.

It will also be preferred in the electrochemical device of the present invention if the resistance control layer is a layer made of a high-resistance metal material or a ceramic material. This also makes it easier to adjust the resistance value of the resistance control layer in the thickness direction, so that a thin resistance control layer having a favorable resistance value can be formed, whereby the safety of the electrochemical device in abnormally high temperature atmospheres can further be improved.

Preferably, in the electrochemical device of the present invention, the second separator is a separator made of a drawn polyolefin. The drawn polyolefin exhibits a high shrinkage ratio in the drawn direction while being easy to control its shrinking direction, and thus is very effective in generating a short circuit between the first and second dummy electrodes in preference to a short circuit between the positive and negative electrodes in the electrode matrix.

Preferably, in the electrochemical device of the present invention, the first separator is a separator made of a polyacrylonitrile or polyamide imide. The polyacrylonitrile and polyamide imide exhibit a shrinkage ratio lower than that of the second separator based on a drawn film such as the one mentioned above, for example, so that the short circuit between the positive and negative electrodes is hard to occur at a higher temperature, thereby being very effective in preferentially causing the short circuit between the first and second dummy electrodes.

Preferably, in the electrochemical device of the present invention, at least one of the first and second dummy electrodes is accommodated within the second separator shaped like a bag having an opening. In this case, when the second separator shrinks, the electrode accommodated therewithin is exposed out of the opening of the bag-shaped separator. Since the shrinking direction of the second separator can be thus controlled, forming the respective opposing parts of the first and second dummy electrodes in the vicinity of the opening can more reliably generate the short circuit between the first and second dummy electrodes. It can also prevent unexpected short circuits from occurring anywhere other than the vicinity of the opening, whereby the safety can be enhanced more.

As in the foregoing, the present invention can provide an electrochemical device which prevents it from exploding and igniting because of temperature rises within its outer package, thereby dramatically improving its safety.

DESCRIPTION OF THE PREFERRED EMBODIMENTS

Figure 1:
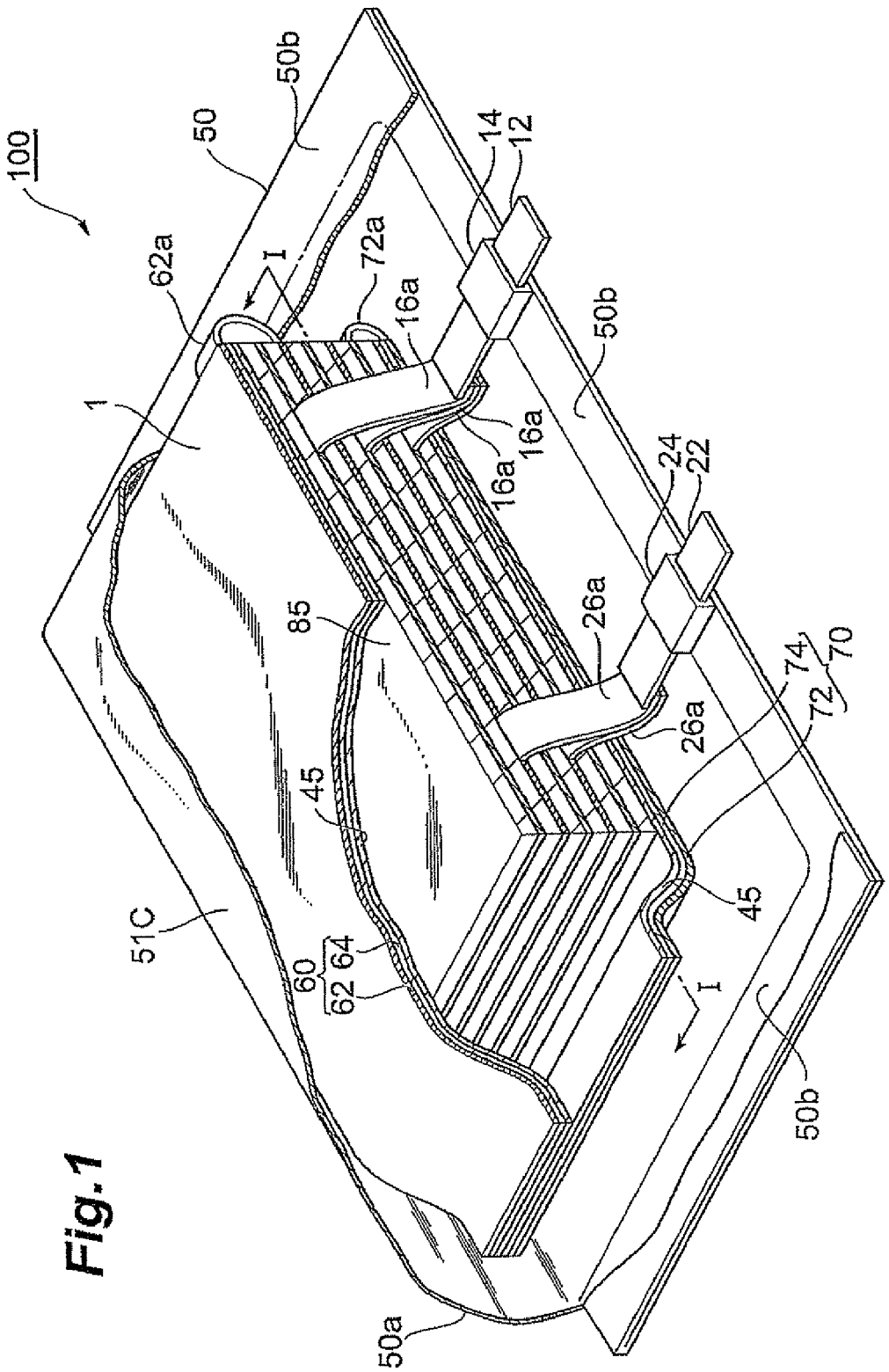
FIG. 1 is a partly broken perspective view illustrating a preferred embodiment of a lithium-ion secondary battery as the electrochemical device of the present invention.

In the following, preferred embodiments of the present invention will be explained in detail with reference to the drawings. In the drawings, identical or equivalent parts will be referred to with the same signs while omitting their overlapping explanations. Positional relationships such as upper/lower and left/right are based on those illustrated in the drawings unless otherwise specified. Ratios of dimensions in the drawings are not limited to those depicted.

Figure 2:
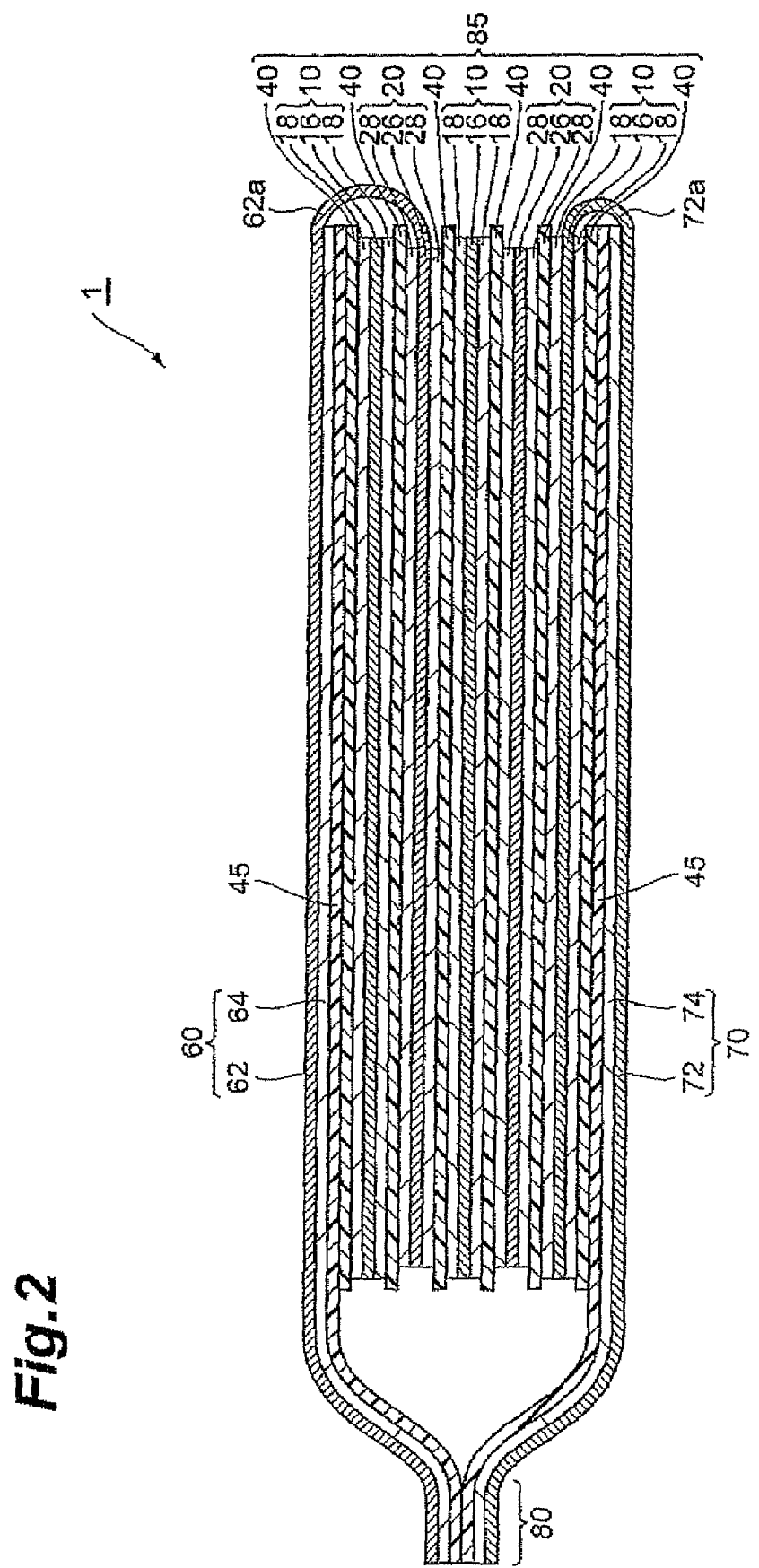
FIG. 2 is a schematic sectional view taken along the line I-I of FIG. 1.

FIG. 1 is a partly broken perspective view illustrating a preferred embodiment of a lithium-ion secondary battery as the electrochemical device of the present invention. FIG. 2 is a partial sectional view taken along the line I-I of FIG. 1. However, an outer package 50 is omitted in FIG. 2.

As illustrated in FIGS. 1 and 2, the lithium-ion secondary battery 100 in accordance with this embodiment is mainly constituted by a multilayer structure 1, a case (outer package) 50 accommodating the multilayer structure 1 in a closed state, and leads 12, 22 for connecting the multilayer structure 1 to the outside of the case 50.

The multilayer structure 1 is composed of an electrode matrix 85 constructed by laminating negative electrodes 10, positive electrodes 20, and first separators 40, and a first dummy electrode 60 and a second dummy electrode 70 which are laminated on respective second separators 45 on the outside of the electrode matrix 85.

As illustrated in FIG. 2, the electrode matrix 85 is one in which the first separator 40, negative electrode 10, first separator 40, positive electrode 20, first separator 40, negative electrode 10, first separator 40, positive electrode 20, first separator 40, negative electrode 10, and first separator 40 are laminated in order from the upper side.

In this specification, the "negative electrode", which is based on the polarity of the battery at the time of discharging, refers to an electrode which releases electrons by an oxidation reaction at the time of discharging. The "positive electrode", which is based on the polarity of the battery at the time of discharging, refers to an electrode which receives electrons by a reduction reaction at the time of discharging.

The case 50 accommodates not only the multilayer structure 1 but also an electrolytic solution (not depicted), which infiltrates the electrode matrix 85.

Constituents of the lithium-ion secondary battery 100 in accordance with this embodiment will now be explained.

Each negative electrode 10 is constituted by a negative electrode current collector 16 and negative electrode active material containing layers 18 formed on both faces of the negative electrode current collector 16.

The negative electrode current collector 16 is not limited in particular as long as it is a good conductor which can sufficiently move electric charges to the negative electrode active material containing layers 18; current collectors employed in known lithium-ion secondary batteries can be used. Specific examples of the negative electrode current collector 16 include metal foils made of copper, nickel, and the like.

Each negative electrode active material containing layer 18 is a layer containing a negative electrode active material, a conductive auxiliary agent, a binder, and the like.

The negative electrode active material is not limited in particular as long as it allows occlusion and release of lithium ions, desorption and insertion of lithium ions, or doping and undoping of lithium ions and their counter anions (e.g., $ClO_4^-$) to proceed reversibly; materials similar to those used in known lithium-ion secondary batteries can be used. Examples include carbon materials such as natural graphite, synthetic graphite, mesocarbon microbeads, mesocarbon fiber (MCF), cokes, glasslike carbon, and fired bodies of organic compounds; metals such as Al, Si, and Sn which are combinable with lithium; amorphous compounds mainly composed of oxides such as $SiO_2$ and $SnO_2$; and lithium titanate ($Li_4Ti_5O_{12}$).

Preferably, the negative electrode active material containing layer 18 has a thickness of 15 to 80 μm. Preferably, the amount of the negative electrode active material supported by the negative electrode active material containing layer 18 is 2 to 12 mg/cm$^2$. Here, the supported amount refers to the mass of the negative electrode active material per unit surface area of the negative electrode current collector 16.

The conductive auxiliary agent is not limited in particular as long as it can make the conductivity of the negative electrode active material containing layer 18 favorable; known conductive auxiliary agents can be used. Examples include carbon blacks; carbon materials; fine powders of metals such as copper, nickel, stainless steel, and iron; mixtures of the carbon materials and metal fine powders; and conductive oxides such as ITO.

The binder is not limited in particular as long as it can bind particles of the negative electrode active material and conductive auxiliary agent to the negative electrode current conductor 16; known binders can be used. Examples include fluororesins such as polyvinylidene fluoride (PVDF), polytetrafluoroethylene (PTFE), tetrafluoroethylene/hexafluoropropylene copolymers (FEP), tetrafluoroethylene/perfluoroalkylvinyl ether copolymers (PFA), ethylene/tetrafluoroethylene copolymers (ETFE), polychlorotrifluoroethylene (PCTFE), ethylene/chlorotrifluoroethylene copolymers (ECTFE), and polyvinyl fluoride (PVF); and styrene/butadiene rubber (SBR).

Each positive electrode 20 is constituted by a positive electrode current collector 26 and positive electrode active material containing layers 28 formed on both faces of the positive electrode current collector 26.

The positive electrode current collector 26 is not limited in particular as long as it is a good conductor which can sufficiently move electric charges to the positive electrode active material containing layers 28; current collectors employed in known lithium-ion secondary batteries can be used. Specific examples of the positive electrode current collector 26 include metal foils made of aluminum and the like.

Each positive electrode active material containing layer 28 is a layer containing a positive electrode active material, a conductive auxiliary agent, a binder, and the like.

The positive electrode active material is not limited in particular as long as it allows occlusion and release of lithium ions, desorption and insertion (intercalation) of lithium ions, or doping and undoping of lithium ions and their counter anions (e.g., $ClO_4^-$) to proceed reversibly; known electrode active materials can be used. Examples include lithium cobaltate ($LiCoO_2$), lithium nickelate ($LiNiO_2$), lithium manganese spinel ($LiMn_2O_4$), and mixed metal oxides such as those expressed by the general formula of $LiNi_xCo_yMn_zO_2$ (x+y+z=1), a lithium vanadium compound ($LiV_2O_5$), olivine-type $LiMPO_4$ (where M is Co, Ni, Mn, or Fe), and lithium titanate ($Li_4Ti_5O_{12}$).

Preferably, the positive electrode active material containing layer 28 has a thickness of 15 to 90 μm. The amount of the positive electrode active material supported by the positive electrode active material containing layer 28 can be set arbitrarily as appropriate in response to the amount of the negative electrode active material supported by the negative electrode active material containing layer 18, but is preferably 5 to 25 mg/cm$^2$, for example.

As for the constituents other than the positive electrode active material contained in the positive electrode active material containing layer 28, materials similar to those constituting the negative electrode active material containing layer 18 can be used. Preferably, the positive electrode active material containing layer 28 also contains a conductive auxiliary agent similar to that in the negative electrode active material containing layer 18.

Each first separator 40 is formed from an electrically insulating porous body. As for the material of the first separator 40, known separator materials can be used without any limitations in particular. Examples of the electrically insulating porous body include multilayer bodies of films made of polyacrylonitrile, polyamide imide, polyethylene, polypropylene, polyolefin, and the like; drawn films of mixtures of the resins mentioned above; and fibrous nonwovens made of at least one constituent material selected from the group consisting of cellulose, polyester, and polypropylene. The first separator 40 is also preferably a fibrous nonwoven of glass, polyacrylonitrile, polyamide imide, or the like coated with polyvinylidene chloride from the viewpoint of restraining it from shrinking in high temperature atmospheres.

Here, as illustrated in FIG. 2, the electrode matrix 85 seen as a plane reduces its area in the order of the first separator 40, negative electrode 10, and positive electrode 20, so that the end faces of the negative electrode 10 project out of the end faces of the positive electrode 20, while the end faces of the first separator 40 project out of the end faces of the negative electrode 10.

This makes it easier for the electrode matrix 85 to cause the whole surface of each positive electrode 20 to oppose its corresponding negative electrode 10 even when the layers are somewhat shifted from each other in directions intersecting the laminating direction because of errors during their manufacture and the like. Therefore, lithium ions released from the positive electrode 20 are fully taken into the negative electrode 10 through the first separator 40. When the lithium ions released from the positive electrode 20 are not fully taken into the negative electrode 10, the lithium ions not taken into the negative electrode 10 are deposited, so that carriers for electric energy decrease, whereby the energy capacity of the battery may deteriorate. Further, since the first separator 40 is greater than each of the positive and negative electrodes 20, 10 and projects out of their end faces, the positive and negative electrodes 20, 10 can be restrained from coming into contact with each other and generating a short circuit.

The first dummy electrode 60 is constituted by a conductor layer 62 and a resistance control layer 64 formed on one face of the conductor layer 62. The second dummy electrode 70 is constituted by a conductor layer 72 and a resistance control layer 74 formed on one face of the conductor layer 72.

As illustrated in FIG. 2, the conductor layer 62 of the first dummy electrode 60 is electrically connected to the positive electrode current collector 26 of the positive electrode 20 through a tongue 62a provided with the conductor layer 62, while the conductor layer 72 of the second dummy electrode 70 is electrically connected to the negative electrode current collector 16 of the negative electrode 10 through a tongue 72a provided with the conductor layer 72. The tongue 62a may be provided either on a side free of the tongues (e.g., 16a, 16a, 16a) of current collectors as illustrated in FIGS. 1 and 2 or on the same side therewith. The first and second dummy electrodes 60, 70 have respective opposing parts 80 opposing each other through the second separators 45 at an outer peripheral part of the electrode matrix 85. The first and second dummy electrodes 60, 70 opposing each other through the second separators 45 are adapted to short-circuit each other at a lower temperature than the positive and negative electrodes 20, 10 opposing each other through the first separators 40 in the electrode matrix 85 do.

As for the conductor layers 62, 72, metal foils similar to those of current collectors to connect therewith are preferably used. In other words, as with the positive electrode current collector 26, a metal foil made of aluminum or the like is preferably used for the conductor layer 62 to be connected to the positive electrode current collector 26 in this embodiment. As with the negative electrode current collector 16, a metal foil made of copper, nickel, or the like is preferably used for the conductor layer 72 to be connected to the negative electrode current collector 16.

The resistance control layers 64, 74 are not limited in particular as long as they can generate a moderate short circuit between the first and second dummy electrodes 60, 70. The resistance values of the resistance control layers 64, 74, which are adjusted after being calculated from the cell capacity and estimated internal short circuit current of the electrochemical device, are regulated such as to yield an estimated short circuit current equivalent to 0.09 C to 1.00 C. When the resistance values of the resistance control layers 64, 74 are such that the estimated internal short circuit current is equivalent to less than 0.09 C, self-discharge cannot be performed sufficiently, whereby a thermally stable charged state is hard to achieve. When the resistance values are such that the estimated internal short circuit current is equivalent to more than 1.00 C, the Joule heat is generated in excess by self-discharge, whereby the temperature of the battery rises drastically. Because of the same reason, the estimated short circuit current is preferably at most 2 A as a current value. The resistance values can be adjusted according to the material, thickness, and the like of the resistance control layers 64, 74.

Each of the resistance control layers 64, 74 is preferably a layer containing a conductive material, a high-resistance material, and a binder, a layer made of a high-resistance metal material, or a layer made of a ceramic material, since a stable resistance value can be obtained with a sufficient thinness thereby.

When any of the resistance control layers 64, 74 is a layer containing a conductive material, a high-resistance material and a binder, examples of the conductive material include carbon black, graphite, carbon nanotubes, acetylene black, and ketjen black, among which carbon black is preferred. Examples of the high-resistance material include ceramic particles and resin particles, among which the ceramic particles are preferred. Examples of the ceramic particles include particles of alumina, silicon dioxide, zirconium oxide, and titanium oxide. Examples of the binder include polyvinylidene fluoride (PVDF) and polytetrafluoroethylene (PTFE).

When any of the resistance control layers 64, 74 is a layer containing a conductive material, a high-resistance material, and a binder, the ratio of the content of the conductive material to that of the binder and high-resistance material is preferably 1:99 to 10:90, more preferably 3:97 to 5:95, in terms of mass ratio. When the content of the conductive material is less than the above-mentioned ratio, the resistance of the resistance control layer tends to become higher than necessary, so that self-discharge is not performed sufficiently, whereby the discharge may fail to advance to a thermally stable charging state. When the content is greater than the above-mentioned ratio, the resistance of the resistance control layer tends to become so low that a greater amount of Joule heat is generated by self-discharge, whereby the battery temperature may rise abnormally.

When any of the resistance control layers 64, 74 is a layer made of a high-resistance metal material, examples of the high-resistance metal material include tungsten, tantalum, and nickel-chromium alloys. Among them, tungsten is preferred from the viewpoint of its favorable film thickness controllability which makes it easier to adjust the resistance value.

When any of the resistance control layers 64, 74 is a layer made of a ceramic material, examples of the ceramic material include amorphous silicon, silicon dioxide, aluminum oxide, and titanium oxide. Among them, amorphous silicon is preferred from the viewpoint of its flexibility to deformations from the outside.

The resistance control layers 64, 74 may be either identical to or different from each other in terms of material, thickness, and the like.

Each second separator 45, which is formed from an electrically insulating material, is preferably made of a porous body or drawn film since a high shrinkage ratio is obtained thereby. As for the material of the second separator 45, known separator materials can be used without any limitations in particular. Examples of the second separator 45 include multilayer bodies of films made of polyethylene terephthalate, polyacrylonitrile, polyethylene, polypropylene, polyolefin, and the like; drawn films of mixtures of the resins mentioned above; and fibrous nonwovens and drawn films made of at least one constituent material selected from the group consisting of cellulose, polyester, and polypropylene. Preferred among them is a drawn film of polyolefin.

From the viewpoint of generating a short circuit between the first and second dummy electrodes 60, 70 in preference to a short circuit between the positive and negative electrodes 20, 10 in the electrode matrix 85, the second separator 45 preferably has a shrinkage ratio of about 0.5 to 10%, more preferably about 3 to 8%, at 120° C.

Preferably, the second separator 45 has an area seen as a plane greater than each of the first and second dummy electrodes 60, 70 in at least the opposing parts 80 between the first and second dummy electrodes 60, 70, so that the end face of the second separator 45 projects out of the end faces of the first and second dummy electrodes 60, 70.

This can restrain the first and second dummy electrodes 60, 70 from unintentionally coming into contact with each other and short-circuiting each other because of errors during their manufacture and the like.

The second separator 45 is also preferably formed like a bag having an opening, within which the dummy electrodes are preferably accommodated. The opening is preferably provided at one side facing the opposing parts 80 of the first and second dummy electrodes 60, 70. Using such a second separator 45 can regulate the shrinking direction of the second separator 45, thereby making it possible to generate a short circuit between the first and second dummy electrodes 60, 70 more reliably.

The method of constructing the first and second dummy electrodes 60, 70 such that they generate a short circuit at a lower temperature than the positive and negative electrodes 20, 10 do is not limited in particular; examples include methods adjusting materials and physical properties of the separators, forms and sizes of the separators and electrodes, and their arrangement. More specific examples include a method of making the second separators 45 shrinkable at a lower temperature than the first separators 40, a method of making the second separators 45 have a higher shrinkage ratio than the first separators 40, and a method of making the end faces of the second separators 45 project out of the end faces of the dummy electrodes by a smaller area than the end faces of the first separators 40 do, so that the dummy electrodes preferentially come into contact with each other even when the first and second separators 40, 45 shrink to similar extents. A method of accommodating the dummy electrodes in the bag-like second separators 45 having openings as mentioned above and controlling the shrinking direction of the second separators 45 may also be employed. A method of accommodating the electrodes in the bag-like first separators 40 without openings and restraining the electrodes from being exposed by the shrinkage of the first separators 40 may also be employed. A plurality of these methods may be used in combinations.

The electrolytic solution is contained within pores of the negative and positive electrode active material containing layers 18, 28 and first separators 40. As for the electrolytic solution, electrolytic solutions (aqueous electrolytic solutions and electrolytic liquids using organic solvents) containing lithium salts employed in known lithium-ion secondary batteries can be used without any limitations in particular. However, electrolytic solutions using organic solvents (nonaqueous electrolytic solutions) are preferred, since the endurable voltage of aqueous electrolytic solutions is limited to a low level because of their electrochemically low decomposition voltage. As the electrolytic solution for the secondary battery, one in which a lithium salt is dissolved in a nonaqueous solvent (organic solvent) is preferably used. As the lithium salt, salts such as $LiPF_6$, $LiClO_4$, $LiBF_4$, $LiAsF_6$, $LiCF_3SO_3$, $LiCF_3$, $LiCF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and the like can be used, for example. These salts may be used singly or in combinations of two or more.

As the organic solvent, solvents employed in known secondary batteries can be used. Preferred examples include propylene carbonate, ethylene carbonate, and diethyl carbonate. They may be used singly or in mixtures of two or more at any ratios.

In this embodiment, the electrolytic solution may not only be a liquid but also a gelled electrolyte obtained by adding a gelling agent thereto. Instead of the electrolytic solution, a solid electrolyte (a solid polymer electrolyte or an electrolyte made of an ionically conductive inorganic material) may be contained.

As illustrated in FIG. 1, the leads 22, 12 project out of the case 50 through a seal part 50b while having ribbon-like outer forms.

The lead 22 is formed from a conductor material such as a metal. As this conductor material, aluminum or the like can be employed, for example. As illustrated in FIG. 1, the end part of the lead 22 within the case 50 is joined to respective tongues 26a, 26a of the positive electrode current collectors 26, 26 by resistance welding or the like, whereby the lead 22 is electrically connected to the positive electrode active material containing layers 28 through the respective positive electrode current collectors 26.

The lead 12 is also formed from a conductor material such as a metal. As this conductor material, a conductive material such as copper or nickel, for example, can be utilized. The end part of the lead 12 within the case 50 is welded to respective tongues 16a, 16a, 16a of the negative electrode current collectors 16, 16, 16, whereby the lead 12 is electrically connected to the negative electrode active material containing layers 18 through the respective negative electrode current collectors 16.

As illustrated in FIG. 1, the parts of the leads 22, 12 held at the seal part 50b of the case 50 are covered with insulators 24, 14 made of a resin or the like in order to enhance sealability. The insulators 24, 14 are not limited in particular in terms of materials, but preferably formed from a synthetic resin, for example. The leads 22, 12 are separated from each other in a direction orthogonal to the laminating direction of the electrode matrix 85.

The case 50 is not limited in particular as long as it can seal the multilayer structure 1 and prevent air and moisture from entering the inside of the case; cases employed for known secondary battery elements can be used. For example, synthetic resins such as epoxy resins and resin-laminated sheets of metals such as aluminum can be used. The case 50, which is formed by folding a flexible rectangular sheet 51C into two at substantially the longitudinal center part thereof, holds the multilayer structure 1 from both sides in the laminating direction (vertical direction) as illustrated in FIG. 1. Among end parts of the two-folded sheet 51C, the seal parts 50b at three sides excluding the bent part 50a are bonded by heat-sealing or with an adhesive, whereby the multilayer structure 1 is sealed therewithin. The case 50 is also bonded to the insulators 24, 14 at the seal part 50b, so as to seal the leads 22, 12.

An example of methods of manufacturing the above-mentioned lithium-ion secondary battery 100 will now be explained.

First, the above-mentioned first separator 40, negative electrode current collector 16, and positive electrode current collector 26 are prepared. Subsequently, respective coating liquids (slurries) containing constituent materials for forming electrode layers to become the negative and positive electrode active material containing layers 18, 28 are made. The negative electrode coating liquid is a solvent containing the above-mentioned negative electrode active material, conductive auxiliary agent, binder, and the like, while the positive electrode coating liquid is a solvent containing the above-mentioned positive electrode active material, conductive auxiliary agent, binder, and the like. The solvent used in the coating liquids is not limited in particular as long as it can dissolve the binders and disperse the active materials and conductive auxiliary agents. For example, N-methyl-2-pyrrolidone, N,N-dimethylformamide, and the like can be used.

Next, the negative electrode coating liquid is applied to both faces of the negative electrode current collector 16 and dried, so as to form the negative electrode active material containing layers 18 on the both faces, and the resulting product is cut into rectangular forms each having a tongue 16a, so as to yield three negative electrodes 10.

Similarly, the positive electrode coating liquid is applied to both faces of the positive electrode current collector 26 and dried, so as to form the positive electrode active material containing layers 28 on the both faces, and the resulting product is cut into rectangular forms each having a tongue 26a, so as to yield two positive electrodes 20.

Here, techniques for applying the coating liquids to the current collectors are not limited in particular, and may be determined appropriately according to the material, form, and the like of metal plates for the current collectors. Examples include metal mask printing, electrostatic coating, dip coating, spray coating, roll coating, doctor blading, gravure coating, and screen printing. After being applied, the coatings are extended by a flat press, calender rolls, or the like if necessary.

Subsequently, the negative and positive electrodes 10, 20 are laminated with the first separators 40 interposed therebetween in the order of FIG. 2, i.e., first separator 40/negative electrode 10/first separator 40/positive electrode 20/first separator 40/negative electrode 10/first separator 40/positive electrode 20/first separator 40/negative electrode 10/first separator 40, and heated while being held at the center parts within the planes on both sides in the laminating direction, so as to yield the electrode matrix 85 illustrated in FIG. 2.

Then, the leads 12, 22 illustrated in FIG. 1 are prepared, and their longitudinal center parts are respectively coated with insulators 14, 24 made of a resin or the like. Subsequently, as illustrated in FIG. 1, the tongues 16a are welded to an end part of the lead 12, while the tongues 26a are welded to an end part of the lead 22. This completes the electrode matrix 85 having the leads 12, 22 connected thereto.

The above-mentioned second separators 45 and conductor layers 62, 72 are also prepared. The resistance control layer 64 is formed on one face of the conductor layer 62, while the resistance control layer 74 is formed on one face of the conductor layer 72.

When the resistance control layers 64, 74 are layers each containing a conductive material, a high-resistance material, and a binder, a coating liquid (slurry) containing the constituent materials mentioned above for forming the resistance control layers 64, 74 is made, applied to the edge part on respective one faces of the conductor layers 62, 72, and dried, so as to form the resistance control layers 64, 74. The solvent used in the coating liquid is not limited in particular as long as it can dissolve the binder and disperse the active material and conductive auxiliary agent. For example, N-methyl-2-pyrrolidone, N,N-dimethylformamide, acetone, and the like can be used.

Techniques for applying the coating liquid to the conductor layers 62, 72 are not limited in particular, and may be determined appropriately according to the materials, forms, and the like of metal plates for the conductor layers. Examples include metal mask printing, electrostatic coating, dip coating, spray coating, roll coating, doctor blading, gravure coating, and screen printing. After being applied, the coatings are extended by a flat press, calender rolls, or the like if necessary.

When the resistance control layers 64, 74 are layers made of a high-resistance metal material, they can be formed by using a film-forming method such as vapor deposition, sputtering, or chemical vapor deposition (CVD).

When the resistance control layers 64, 74 are layers made of a ceramic material, they can be formed by using a film-forming method such as vapor deposition, sputtering, or chemical vapor deposition (CVD).

Next, the respective multilayer bodies in which the resistance control layers 64, 74 are laminated on the conductor layers 62, 72 are cut out into rectangular forms having the tongues 62a, 72a, so as to yield the first and second dummy electrodes 60, 70.

Subsequently, the first and second dummy electrode 60, 70 are laminated on respective main faces of the electrode matrix 85 while interposing the second separators 45 therebetween so as to have the opposing parts 80 at an outer peripheral part of the electrode matrix 85. Then, the parts holding the electrode matrix 85 is heated while being held at the center parts within the planes on both sides in the laminating direction, the opposing parts 80 are heated while being held at the center parts within the planes in the laminating direction, and the dummy electrodes are connected to their corresponding electrodes within the electrode matrix 85 through the tongues 62a, 72a, so as to yield the multilayer structure 1 illustrated in FIG. 1.

Next, a bag-shaped case 50 formed from a sheet in which aluminum is laminated with a thermally adhesive resin layer is prepared, the multilayer structure 1 is inserted therein from its opening, and an electrolytic solution is injected into the case 50 within a vacuum container, so that the multilayer structure 1 is dipped in the electrolytic solution. Thereafter, each of the leads 22, 12 is partly projected out of the case 50, and the opening 50c of the case 50 is sealed with a heat sealer. This completes the making of the lithium-ion secondary battery 100.

The present invention can be modified in various ways without being restricted to the above-mentioned embodiment.

Figure 3:
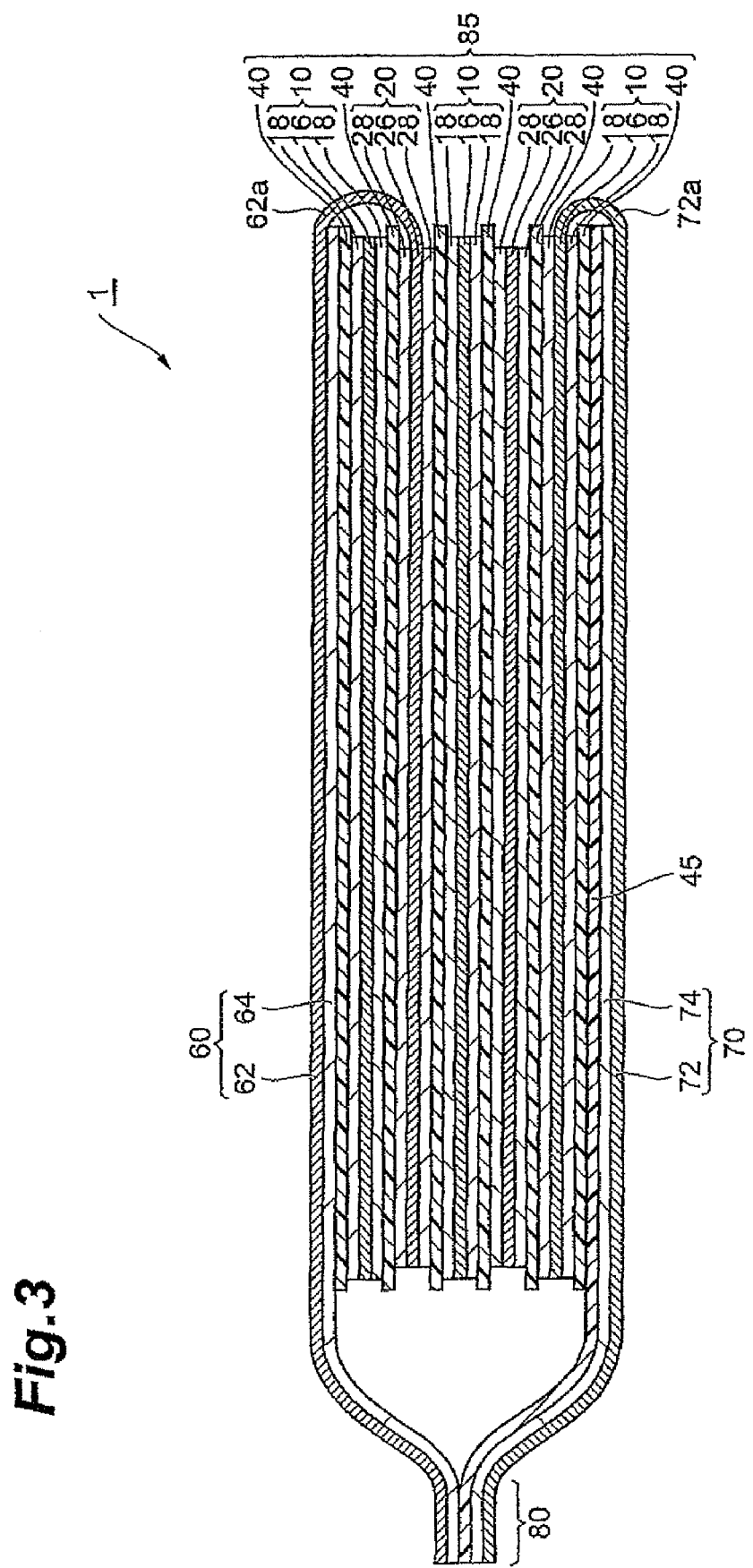
FIG. 3 is a schematic sectional view illustrating another preferred embodiment of the lithium-ion secondary battery as the electrochemical device of the present invention.

FIG. 3 is a schematic sectional view illustrating another preferred embodiment of the lithium-ion secondary battery as the electrochemical device of the present invention. FIG. 3 omits the outer package 50. As illustrated in FIG. 3, the first dummy electrode 60 in the multilayer structure 1 may directly be laminated on one main face of the electrode matrix 85 without the second separator 45. In this case, the first and second dummy electrodes 60, 70 oppose each other in the opposing parts 80 only through the second separator 45 laminated on the second dummy electrode 70. Though FIG. 3 illustrates a case where the second separator 45 is not laminated on the first dummy electrode 60, the second dummy electrode 70 may be free of the second separator 45 if the second separator 45 is laminated on the first dummy electrode 60.

Figure 4:
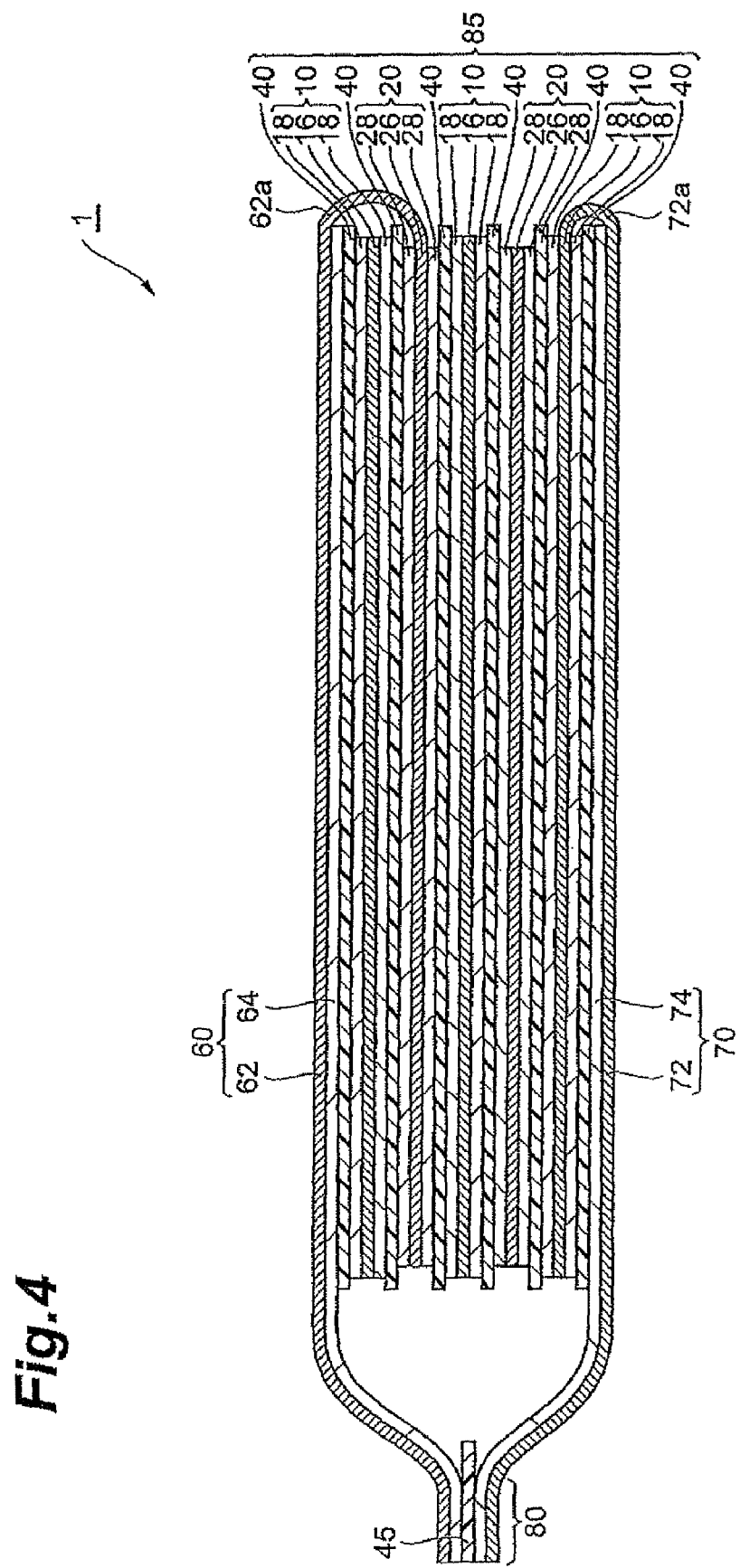
FIG. 4 is a schematic sectional view illustrating still another preferred embodiment of the lithium-ion secondary battery as the electrochemical device of the present invention.

FIG. 4 is a schematic sectional view illustrating still another preferred embodiment of the lithium-ion secondary battery as the electrochemical device of the present invention. FIG. 4 omits the outer package 50. As illustrated in FIG. 4, both of the first and second dummy electrodes 60, 70 in the multilayer structure 1 may directly be laminated on both main faces of the electrode matrix 85. In this case, the second separator 45 is arranged in at least the opposing parts 80 between the first and second dummy electrodes 60, 70.

Figure 5:
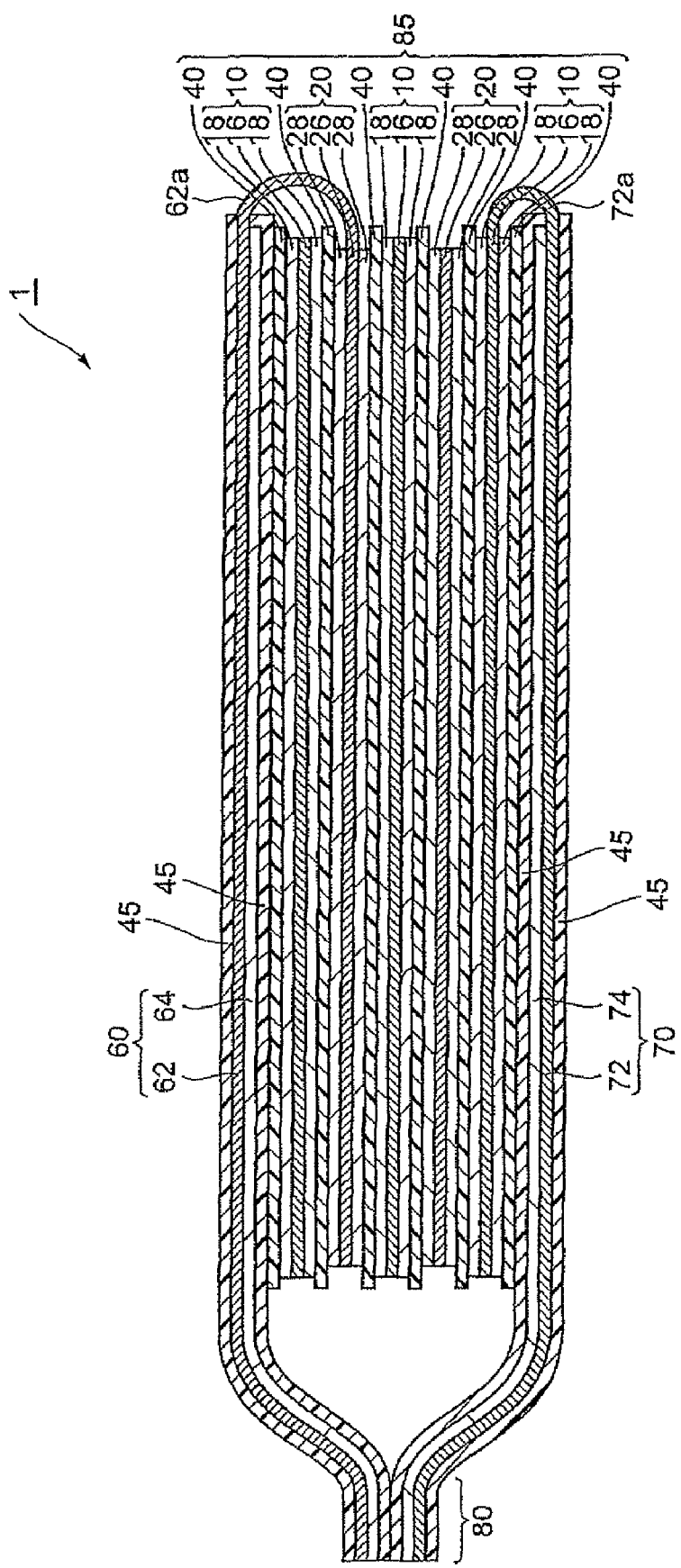
FIG. 5 is a schematic sectional view illustrating still another preferred embodiment of the lithium-ion secondary battery as the electrochemical device of the present invention.

FIG. 5 is a schematic sectional view illustrating still another preferred embodiment of the lithium-ion secondary battery as the electrochemical device of the present invention. FIG. 5 omits the outer package 50. As illustrated in FIG. 5, the first and second dummy electrodes 60, 70 in the multilayer structure 1 may be accommodated in respective bag-shaped second separators 45. Here, each bag-shaped second separator 45 has an opening on the side facing the opposing parts 80 between the first and second dummy electrodes 60, 70, thereby regulating the shrinking direction at the time of thermal shrinkage.

Though FIG. 5 illustrates a case where the dummy electrodes are accommodated in the bag-shaped separators, it will also be preferred if at least one of the negative and positive electrodes 10, 20 is accommodated in the bag-shaped first separator 40. Preferably, the bag-shaped first separator 40 has no opening in this case.

Figure 6:
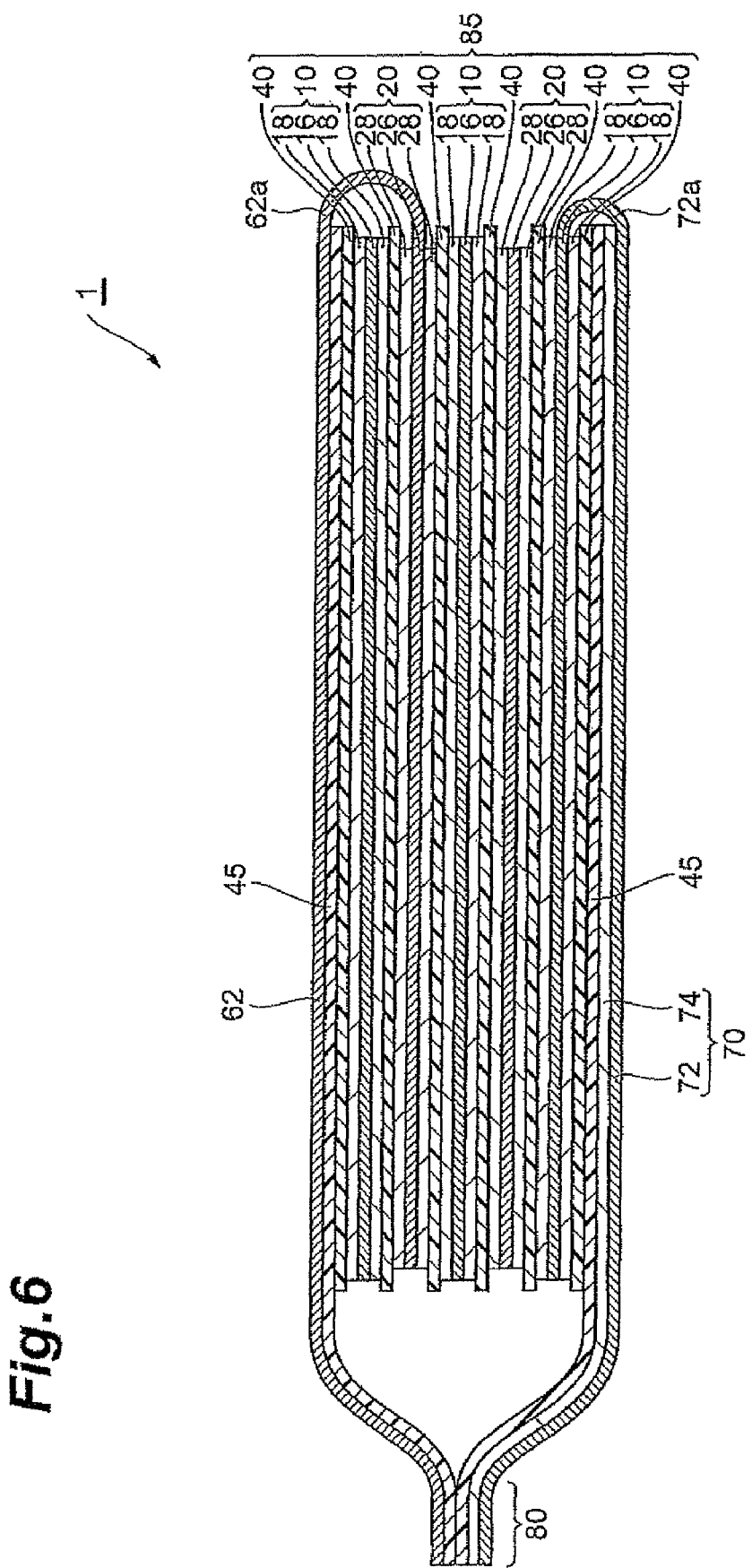
FIG. 6 is a schematic sectional view illustrating still another preferred embodiment of the lithium-ion secondary battery as the electrochemical device of the present invention.

FIG. 6 is a schematic sectional view illustrating still another preferred embodiment of the lithium-ion secondary battery as the electrochemical device of the present invention. FIG. 6 omits the outer package 50. As illustrated in FIG. 6, the first dummy electrode 60 in the multilayer structure 1 may be free of the resistance control layer 64. When the first and second dummy electrodes 60, 70 short-circuit each other in the opposing parts 80, they do so only through the resistance control layer 74 of the second dummy electrode 70. Though FIG. 6 illustrates a case where the first dummy electrode 60 does not have the resistance control layer 64, the second dummy electrode 70 may be free of the resistance control layer 74 if the first dummy electrode 60 has the resistance control layer 64.

Though the electrode matrix 85 in the above-mentioned embodiments has four secondary battery elements as single cells, i.e., combinations of negative electrode/separator/positive electrode, the number of secondary battery elements may be more than 4 or less than 3, e.g., 1.

Though the above-mentioned embodiments exemplify a mode in which each of the outermost two electrodes in the electrode matrix 85 is a three-tier negative electrode 10 in which the negative electrode active material containing layers 18 are formed on both faces of the negative electrode current collector 16 as a preferred mode, one or each of the outermost two electrodes may be realized as a two-tier negative electrode in which the negative electrode active material containing layer 18 is formed on one face of the negative electrode current collector 16.

Though the above-mentioned embodiments exemplify a mode in which each of the outermost two electrodes in the electrode matrix 85 is the negative electrode 10 as a preferred mode, the present invention can be carried out with the outermost two electrodes being the positive electrode 20 and negative electrode 10, respectively, or both the positive electrodes 20, 20.

Though the above-mentioned embodiments exemplify a mode in which each of the outermost two layers in the electrode matrix 85 is the first separator 40 as a preferred mode, the outermost electrodes in the electrode matrix 85 may be employed as the outermost layers instead of the first separators 40 as long as these electrodes are securely insulated from the dummy electrodes adjacent thereto. The outermost electrodes may also be employed as the outermost layers instead of the first separators 40 when there is no need to insulate these electrodes from the dummy electrodes adjacent thereto. For example, it is not always necessary for the first separator 40 to be arranged between the second dummy electrode 70 and its neighboring positive electrode 20 in FIGS. 2 to 5, since the conductor layer 62 and the positive electrode current collector 26 are electrically connected to each other.

Though the above-mentioned embodiments relate to a case where the electrochemical device is a lithium-ion secondary battery, the electrochemical device of the present invention is not limited to the lithium-ion secondary battery, but may be any of secondary batteries other than the lithium-ion secondary batteries, such as metal lithium secondary batteries, and electrochemical capacitors such as electric double layer capacitors, pseudocapacity capacitors, pseudocapacitors, and redox capacitors. In the case of electrochemical devices other than the lithium-ion secondary batteries, electrode active materials suitable for the respective electrochemical devices may be used. In the case of an electric double layer capacitor for example, acetylene black, graphite, activated carbon, and the like are used as the active materials contained in the positive and negative electrode active material containing layers.

EXAMPLES

In the following, the present invention will be explained more specifically with reference to examples and comparative examples, though the present invention is not limited to the following examples. The following examples and comparative examples relate to lithium-ion secondary batteries having a designed voltage value of 4.2 V.

Example 1

Making of Negative Electrode

A negative electrode was made by the following procedure. First, 90 parts by mass of mesocarbon microbeads (MCMB) (manufactured by Osaka Gas Co., Ltd.) and 1 part by mass of graphite (product name: KS-6 manufactured by Lonza) as a negative electrode active material, 2 parts by mass of carbon black (product name: DAB manufactured by Denki Kagaku Kogyo, K. K.) as a conductive auxiliary agent, and 7 parts by mass of polyvinylidene fluoride (product name: Kynar 761 manufactured by Atofina) as a binder were mixed and dispersed, and then an appropriate amount of N-methylpyrrolidone (NMP) as a solvent was added thereto, so as to adjust viscosity, thereby making a slurry-like negative electrode coating liquid.

Subsequently, a copper foil (having a thickness of 20 μm) as a negative electrode current collector was prepared, and the negative electrode coating liquid was applied to both faces of the copper foil and dried, so as to form negative electrode active material containing layers (each having a thickness of 75 μm). Thus obtained negative electrode sheet was punched out into such a form that each active material containing layer surface had a size of 144 mm×102 mm while the current collector had a tongue to become an external output terminal, thus yielding a negative electrode.

Making of Positive Electrode

A positive electrode was made by the following procedure. First, 91 parts by mass of lithium cobaltate ($LiCoO_2$) (product name: Selion manufactured by Seimi Chemical Co., Ltd.) and 4 parts by mass of graphite (product name: KS-6 manufactured by Lonza) as a positive electrode active material, 2 parts by mass of carbon black (product name: DAB manufactured by Denki Kagaku Kogyo, K. K.) as a conductive auxiliary agent, and 3 parts by mass of polyvinylidene fluoride (product name: Kynar 761 manufactured by Atofina) as a binder were mixed and dispersed, and then an appropriate amount of N-methylpyrrolidone (NMP) as a solvent was added thereto, so as to adjust viscosity, thereby making a slurry-like positive electrode coating liquid.

Subsequently, an aluminum foil (having a thickness of 15 μm) as a positive electrode current collector was prepared, and the positive electrode coating liquid was applied to both faces of the aluminum foil and dried, so as to form positive electrode active material containing layers (each having a thickness of 95 μm). Thus obtained positive electrode sheet was punched out into such a form that each active material containing layer surface had a size of 142 mm×100 mm while the current collector had a tongue to become an external output terminal, thus yielding a positive electrode.

Making of Electrode Matrix

As separators (first separators), porous films made of a polyacrylonitrile resin (PAN) (each having a size of 148 mm×106 mm with a thickness of 24 μm) were prepared. Then, four negative electrodes and three positive electrodes were alternately laminated with the separators, so as to yield an electrode matrix having the same multilayer structure as that illustrated in FIG. 2 except for the numbers of laminated electrodes and separators.

Making of Dummy Electrode

After mixing and dispersing 10 parts by mass of carbon black (product name: DAB manufactured by Denki Kagalu Kogyo, K. K.), 40 parts by mass of polyvinylidene fluoride (product name: Kynar 761 manufactured by Atofina) as a binder, and 50 parts by mass of zirconia oxide particles (product name: Zirconia Oxide, manufactured by Kojundo Chemical Lab. Co., Ltd., having an average particle size of 1 μm), an appropriate amount of N-methylpyrrolidone (NMP) as a solvent was added thereto, so as to adjust viscosity, thereby making a slurry-like resistance control layer coating liquid.

Subsequently, an aluminum foil (having a thickness of 20 μm) as a conductor layer was prepared, and the resistance control layer coating liquid was applied to one face of the conductor layer and dried, so as to form a resistance control layer (having a thickness of 20 μm). Thus obtained dummy electrode sheet was punched out into such a form that the resistance control layer surface had a size of 144 mm×102 mm while the conductor layer had a tongue to connect with a current collector of the electrode matrix, thus yielding a first dummy electrode.

Also, a copper foil (having a thickness of 20 μm) as a conductor layer was prepared, and the resistance control layer coating liquid was applied to one face of the conductor layer and dried, so as to form a resistance control layer (having a thickness of 20 μm). Thus obtained dummy electrode sheet was punched out into such a form that the resistance control layer surface had a size of 144 mm×102 mm while the conductor layer had a tongue to connect with a current collector of the electrode matrix, thus yielding a second dummy electrode.

Making of Lithium-Ion Secondary Battery

As separators (second separators), porous films made of a drawn polyolefin (product name: SV722, manufactured by Asahi Kasei Corporation, having a size of 148 mm×106 mm with a thickness of 22 μm) were prepared. These separators were laminated on the resistance control layers of the dummy electrodes, so as to yield separator-equipped dummy electrodes. Subsequently, the separator-equipped dummy electrodes were laminated on both end faces in the laminating direction of the electrode matrix, and opposing parts where the first and second dummy electrodes opposed each other through the second separator were formed at an outer peripheral part of the electrode matrix. Further, the conductor layers of the first and second dummy electrodes were electrically connected to the positive and negative electrode current collectors through the tongues provided with the conductor layers, respectively. This yielded a multilayer structure having the same multilayer structure as that illustrated in FIG. 2 except for the numbers of laminated electrodes and separators.

Subsequently, thus obtained multilayer structure was put into an outer package made of an aluminum-laminated film. The outer package was sealed after injecting therein an electrolytic solution composed of a mixture of propylene carbonate (PC), ethylene carbonate (EC), and diethyl carbonate (DEC) at a volume ratio of 2:1:7 as a solvent and 1.5 mol/L of $LiPF_6$ as a solute, so as to yield a lithium-ion secondary battery having the same structure as that illustrated in FIG. 1 except for the numbers of laminated electrodes and separators.

Example 2

In the making of dummy electrodes, after mixing and dispersing 5 parts by mass of carbon black (product name: DAB manufactured by Denki Kagaku Kogyo, K. K.), 40 parts by mass of polyvinylidene fluoride (product name: Kynar 761 manufactured by Atofina) as a binder, and 55 parts by mass of zirconia oxide particles (product name: Zirconia Oxide, manufactured by Kojundo Chemical Lab. Co., Ltd., having an average particle size of 1 μm), an appropriate amount of N-methylpyrrolidone (NMP) as a solvent was added thereto, so as to adjust viscosity, thereby making a slurry-like resistance control layer coating liquid. Except for using this resistance control layer coating liquid, a lithium-ion secondary battery was made as in Example 1.

Example 3

In the making of dummy electrodes, after mixing and dispersing 3 parts by mass of carbon black (product name: DAB manufactured by Denki Kagaku Kogyo, K. K.), 40 parts by mass of polyvinylidene fluoride (product name: Kynar 761 manufactured by Atofina) as a binder, and 57 parts by mass of zirconia oxide particles (product name: Zirconia Oxide, manufactured by Kojundo Chemical Lab. Co., Ltd., having an average particle size of 1 μm), an appropriate amount of N-methylpyrrolidone (NMP) as a solvent was added thereto, so as to adjust viscosity, thereby making a slurry-like resistance control layer coating liquid. Except for using this resistance control layer coating liquid, a lithium-ion secondary battery was made as in Example 1.

Example 4

In the making of dummy electrodes, after mixing and dispersing 2 parts by mass of carbon black (product name: DAB manufactured by Denki Kagaku Kogyo, K. K.), 40 parts by mass of polyvinylidene fluoride (product name: Kynar 761 manufactured by Atofina) as a binder, and 58 parts by mass of zirconia oxide particles (product name: Zirconia Oxide, manufactured by Kojundo Chemical Lab. Co., Ltd., having an average particle size of 1 μm), an appropriate amount of N-methylpyrrolidone (NMP) as a solvent was added thereto, so as to adjust viscosity, thereby making a slurry-like resistance control layer coating liquid. Except for using this resistance control layer coating liquid, a lithium-ion secondary battery was made as in Example 1.

Example 5

A lithium-ion secondary battery was made as in Example 1 except that the number of negative electrodes was 19 and the number of positive electrodes was 18 in the making of the electrode matrix.

Example 6

A lithium-ion secondary battery was made as in Example 2 except that the number of negative electrodes was 19 and the number of positive electrodes was 18 in the making of the electrode matrix.

Comparative Example 1

A lithium-ion secondary battery was made as in Example 1 except that no dummy electrode was provided.

Comparative Example 2

In the making of dummy electrodes, after mixing and dispersing 20 parts by mass of carbon black (product name: DAB manufactured by Denki Kagaku Kogyo, K. K.), 40 parts by mass of polyvinylidene fluoride (product name: Kynar 761 manufactured by Atofina) as a binder, and 40 parts by mass of zirconia oxide particles (product name: Zirconia Oxide, manufactured by Kojundo Chemical Lab. Co., Ltd., having an average particle size of 1 μm), an appropriate amount of N-methylpyrrolidone (NMP) as a solvent was added thereto, so as to adjust viscosity, thereby making a slurry-like resistance control layer coating liquid. Except for using this resistance control layer coating liquid, a lithium-ion secondary battery was made as in Example 1.

Comparative Example 3

In the making of dummy electrodes, after mixing and dispersing 1 part by mass of carbon black (product name: DAB manufactured by Denki Kagaku Kogyo, K. K.), 40 parts by mass of polyvinylidene fluoride (product name: Kynar 761 manufactured by Atofina) as a binder, and 59 parts by mass of zirconia oxide particles (product name: Zirconia Oxide, manufactured by Kojundo Chemical Lab. Co., Ltd., having an average particle size of 1 μm), an appropriate amount of N-methylpyrrolidone (NMP) as a solvent was added thereto, so as to adjust viscosity, thereby making a slurry-like resistance control layer coating liquid. Except for using this resistance control layer coating liquid, a lithium-ion secondary battery was made as in Example 1.

Comparative Example 4

A lithium-ion secondary battery was made as in Example 5 except that no dummy electrode was provided.

Measurement of Discharged Capacity

The discharged capacity of each of the lithium-ion secondary batteries of Examples 1 to 6 and Comparative Examples 1 to 4 was measured by performing constant current constant voltage charging to 4.2 V with a current equivalent to 0.5 C and then discharging to 3.3 V with a current equivalent to 0.5 C. Table 1 lists the results.

Measurement of Resistance Value of Resistance Control Layer

The resistance value in the thickness direction of the resistance control layers of dummy electrodes used in the lithium-ion secondary batteries of Examples 1 to 6 and Comparative Examples 2 and 3 was measured by the following method. While both sides (resistance control layer side and current collector side) of each dummy electrode were held with probe electrodes having a diameter of 0.3 mm, the voltage upon application of a constant current of 50 mA was measured with a potentio/galvanostat (product name: HA-151 manufactured by Hokuto Denko Corporation), so as to calculate the resistance value of the resistance control layer. The resistance value was measured for each of the first and second dummy electrodes, so as to calculate their total value. Table 1 lists the results.

Measurement of Battery Voltage

The fully charged battery voltage of each of the lithium-ion secondary batteries of Examples 1 to 6 and Comparative Examples 1 to 4 was verified to be their designed value of 4.2 V. Specifically, the voltage of each of the fully charged lithium-ion secondary batteries was measured by a voltmeter (product name: BATTERY HiTESTER 3555 manufactured by Hioki E. E. Corporation). As a result, it was verified that all the lithium-ion secondary batteries had the fully charged battery voltage of 4.2 V as designed.

Calculation of Estimated Internal Short Circuit Current

An estimated internal short circuit current of each of the lithium-ion secondary batteries of Examples 1 to 6 and Comparative Examples 1 to 4 was calculated according to the following equation (1). Here, the discharged capacity, the resistance value of the resistance control layer, and the fully charged battery voltage were measured by the respective methods mentioned above. Table 1 lists the results.

[Math. 1]

$$\text{Estimated internal short circuit current } (C) = \frac{\text{fully charged battery voltage (V)}}{\text{discharged capacity (Ah)} \times \text{resistance value of resistance control layer } (\Omega)} \quad (1)$$

Safety Evaluation

The lithium-ion secondary batteries of Examples 1 to 6 and Comparative Examples 1 to 4 were subjected to a 155° C. heating test in the fully charged state, so as to evaluate their safety. Specifically, each lithium-ion secondary battery was subjected to constant current constant voltage charging to 4.2 V with a current equivalent to 0.5 C. While being kept in a high-temperature vessel, the charged lithium-ion secondary battery was heated to 155° C. at a heating rate of 5° C./min and then held at 155° C. for 1 hr. Here, the temperature change (reached temperature) of the lithium-ion secondary battery during the heating and holding was measured, so as to evaluate the stability of the lithium-ion secondary battery. For example, batteries with lower thermostability tend to exhibit steeper temperature rises than the heating profile of the high-temperature vessel in the process of heating (in the vicinity of 120° C.). Such a phenomenon is presumed to be caused by gas generation within the lithium-ion secondary batteries. By contrast, lithium-ion secondary batteries having higher thermostability generate less heat from therewithin, so as to exhibit a thermal behavior similar to the heating profile of the high-temperature vessel. Table 1 lists the results. The lower the reached temperature is, the higher the safety becomes. In this test, the lithium-ion secondary batteries exhibiting inflation and smoke, thus causing problems in their safety, were indicated with "inflation, smoke".

TABLE 1

| | Discharged capacity (Ah) | Battery voltage (V) | Estimated internal short circuit current (C) | Resistance control layer | | | | | Reached temperature (° C.) |
| --- | --- | --- | --- | --- | --- | --- | --- | --- | --- |
| | | | | Carbon black content (mass %) | Binder content (mass %) | Ceramic particle content (mass %) | Thickness (μm) | Total resistance value (Ω) | |
| Example 1 | 2.1 | 4.20 | 1.00 | 10 | 40 | 50 | 20 | 2.0 | 157 |
| Example 2 | 2.0 | 4.20 | 0.44 | 5 | 40 | 55 | 20 | 4.8 | 155 |
| Example 3 | 2.0 | 4.20 | 0.21 | 3 | 40 | 57 | 20 | 10.0 | 156 |
| Example 4 | 2.0 | 4.20 | 0.12 | 2 | 40 | 58 | 20 | 18.0 | 158 |
| Example 5 | 10.3 | 4.20 | 0.20 | 10 | 40 | 50 | 20 | 2.0 | 156 |
| Example 6 | 10.0 | 4.20 | 0.09 | 5 | 40 | 55 | 20 | 4.8 | 159 |
| Comparative Example 1 | 2.1 | 4.20 | — | — | — | — | — | — | inflation, smoke |
| Comparative Example 2 | 2.1 | 4.20 | 1.67 | 20 | 40 | 40 | 20 | 1.2 | inflation, smoke |
| Comparative Example 3 | 2.1 | 4.20 | 0.07 | 1 | 40 | 59 | 20 | 30.0 | inflation, smoke |
| Comparative Example 4 | 10.9 | 4.20 | — | — | — | — | — | — | inflation, smoke |

Example 7

Dummy electrodes were made by the following procedure. An aluminum foil (having a thickness of 20 μm) was prepared as a conductor layer, on which a resistance control layer (having a thickness of 0.18 μm) made of tungsten (having a specific resistance of $5.65 \times 10^{-3}$ mΩ·cm) was formed by sputtering. Thus obtained dummy electrode sheet was punched out into a form similar to that of Example 1, so as to yield a first dummy electrode. On the other hand, a copper foil (having a thickness of 20 μm) was prepared as a conductor layer, on which a resistance control layer (having a thickness of 0.18 μm) made of tungsten (having a specific resistance of $5.65 \times 10^{-3}$ mΩ·cm) was formed by sputtering. Thus obtained dummy electrode sheet was punched out into a form similar to that of Example 1, so as to yield a second dummy electrode. Except for using these first and second dummy electrodes, a lithium-ion secondary battery was made as in Example 1.

Example 8

A lithium-ion secondary battery was made as in Example 7 except that the thickness of the resistance control layer made of tungsten was 0.88 μm in each of the first and second dummy electrodes.

Example 9

A lithium-ion secondary battery was made as in Example 7 except that the thickness of the resistance control layer made of tungsten was 1.60 μm in each of the first and second dummy electrodes.

Example 10

Dummy electrodes were made by the following procedure. An aluminum foil (having a thickness of 20 μm) was prepared as a conductor layer, on which a resistance control layer (having a thickness of 0.28 μm) made of amorphous silicon (having a specific resistance of $3.4 \times 10^{-3}$ mΩ·cm) was formed by CVD using an $SiH_4 + H_2$ gas. Thus obtained dummy electrode sheet was punched out into a form similar to that of Example 1, so as to yield a first dummy electrode. On the other hand, a copper foil (having a thickness of 20 μm) was prepared as a conductor layer, on which a resistance control layer (having a thickness of 0.28 μm) made of amorphous silicon (having a specific resistance of $3.4 \times 10^{-3}$ mΩ·cm) was formed by CVD as with the first dummy electrode. Thus obtained dummy electrode sheet was punched out into a form similar to that of Example 1, so as to yield a second dummy electrode. Except for using these first and second dummy electrodes, a lithium-ion secondary battery was made as in Example 1.

Example 11

A lithium-ion secondary battery was made as in Example 10 except that the thickness of the resistance control layer made of amorphous silicon was 1.43 μm in each of the first and second dummy electrodes.

Example 12

A lithium-ion secondary battery was made as in Example 10 except that the thickness of the resistance control layer made of amorphous silicon was 2.57 μm in each of the first and second dummy electrodes.

Comparative Example 5

A lithium-ion secondary battery was made as in Example 7 except that the thickness of the resistance control layer made of tungsten was 0.10 μm in each of the first and second dummy electrodes.

Comparative Example 6

A lithium-ion secondary battery was made as in Example 7 except that the thickness of the resistance control layer made of tungsten was 2.65 μm in each of the first and second dummy electrodes.

Comparative Example 7

A lithium-ion secondary battery was made as in Example 10 except that the thickness of the resistance control layer made of amorphous silicon was 0.21 μm in each of the first and second dummy electrodes.

Comparative Example 8

A lithium-ion secondary battery was made as in Example 10 except that the thickness of the resistance control layer made of amorphous silicon was 4.24 μm in each of the first and second dummy electrodes.

Evaluations of Battery Characteristics

For the lithium-ion secondary batteries of Examples 7 to 12 and Comparative Examples 5 to 8, evaluations of battery characteristics, i.e., measurement of discharged capacity, the resistance value of the resistance control layer, and battery voltage, calculation of the estimated internal short circuit current, and safety evaluation, were carried out by the same methods as those mentioned above. Table 2 lists the results.

TABLE 2

| | Discharged capacity (Ah) | Battery voltage (V) | Estimated internal short circuit current (C) | Resistance control layer | | | Reached temperature (° C.) |
|---|---|---|---|---|---|---|---|
| | | | | Material | Thickness (μm) | Total resistance value (Ω) | |
| Example 7 | 2.0 | 4.20 | 0.95 | tungsten | 0.18 | 2.2 | 156 |
| Example 8 | 2.0 | 4.20 | 0.21 | tungsten | 0.88 | 10.0 | 155 |
| Example 9 | 2.1 | 4.20 | 0.11 | tungsten | 1.60 | 18.3 | 158 |
| Comparative Example 5 | 2.1 | 4.20 | 1.18 | tungsten | 0.10 | 1.7 | inflation, smoke |
| Comparative Example 6 | 2.1 | 4.20 | 0.07 | tungsten | 2.65 | 29.5 | inflation, smoke |
| Example 10 | 2.0 | 4.20 | 1.05 | amorphous silicon | 0.28 | 2.0 | 156 |
| Example 11 | 2.0 | 4.20 | 0.20 | amorphous silicon | 1.43 | 10.6 | 155 |
| Example 12 | 2.1 | 4.20 | 0.12 | amorphous silicon | 2.57 | 17.3 | 158 |
| Comparative Example 7 | 2.1 | 4.20 | 1.43 | amorphous silicon | 0.21 | 1.4 | inflation, smoke |
| Comparative Example 8 | 2.1 | 4.20 | 0.07 | amorphous silicon | 4.24 | 30.3 | inflation, smoke |

What is claimed is:

1. An electrochemical device comprising:
an electrode matrix including a multilayer structure laminating positive and negative electrodes with a first separator interposed therebetween; and
first and second dummy electrodes respectively arranged on both end faces in the laminating direction of the electrode matrix;
wherein one of the first and second dummy electrodes and the other are electrically connected to the positive and negative electrodes in the electrode matrix, respectively;
wherein the first and second dummy electrodes have respective opposing parts opposing each other through a second separator at an outer peripheral part of the electrode matrix;
wherein within the outer peripheral part of the electrode matrix, the first and second dummy electrodes do not oppose each other through the first separator;
wherein one or each of the first and second dummy electrodes has a resistance control layer at least on a side where the opposing parts oppose each other;
wherein the resistance control layer has a resistance value as a total resistance value of the first and second dummy electrodes falling in such a range that an estimated internal short circuit current between the first and second dummy electrodes is equivalent to 0.09 C to 1.00 C; and
wherein the first and second dummy electrodes opposing each other through the second separator are adapted to short-circuit each other at a lower temperature than the positive and negative electrodes opposing each other through the first separator in the electrode matrix do.

2. An electrochemical device according to claim 1, wherein each of the first and second dummy electrodes has the resistance control layer.

3. An electrochemical device according to claim 1, wherein one of the first and second dummy electrodes has the resistance control layer.

4. An electrochemical device according to claim 1, wherein the resistance control layer is a layer containing carbon black, a binder, and a ceramic particle.

5. An electrochemical device according to claim 4, wherein the ratio of the content of the carbon black to that of a combination of both of the binder and ceramic particle in the resistance control layer is 1:99 to 10:90 in terms of mass ratio.

6. An electrochemical device according to claim 1, wherein the resistance control layer is a layer made of a high-resistance metal material or a ceramic material.

7. An electrochemical device according to claim 1, wherein the second separator is a separator made of a drawn polyolefin.

8. An electrochemical device according to claim 1, wherein the first separator is a separator made of a polyacrylonitrile or polyamide imide.

9. An electrochemical device according to claim 1, wherein at least one of the first and second dummy electrodes is accommodated within the second separator shaped like a bag having an opening.

* * * * *